US006742345B2

(12) United States Patent
Carr

(10) Patent No.: US 6,742,345 B2
(45) Date of Patent: Jun. 1, 2004

(54) TEMPERATURE CONTROL SYSTEM USING AQUEOUS 1,3-PROPANEDIOL SOLUTION

(75) Inventor: Richard P. Carr, Naperville, IL (US)

(73) Assignee: The Penray Companies, Inc., Wheeling, IL (US)

( * ) Notice: Subject to any disclaimer, the term of this patent is extended or adjusted under 35 U.S.C. 154(b) by 0 days.

(21) Appl. No.: 10/107,896

(22) Filed: Mar. 27, 2002

(65) Prior Publication Data

US 2003/0182949 A1 Oct. 2, 2003

(51) Int. Cl.[7] .............................. F25D 17/02; C09K 5/00
(52) U.S. Cl. ................ 62/99; 62/114; 62/185; 252/67
(58) Field of Search ........................... 62/99, 114, 185; 252/67

(56) References Cited

U.S. PATENT DOCUMENTS

| 1,213,368 A | 1/1917 | Hibbert |
| 1,696,642 A | 12/1928 | Massa |
| 1,820,085 A | 8/1931 | Moormann |
| 1,914,222 A | 6/1933 | Taylor |
| 2,003,429 A | 6/1935 | Cox |
| 2,087,098 A | 7/1937 | Spiegler et al. |
| 2,094,564 A | 9/1937 | Schenck et al. |
| 2,226,487 A | 12/1940 | Zink |
| 2,229,215 A | 1/1941 | Magruder, Jr. et al. |
| 2,369,435 A | 2/1945 | Coghill et al. |
| 2,378,087 A | 6/1945 | Kearney |
| 2,462,694 A | 2/1949 | Walker |
| 2,525,478 A | 10/1950 | Cunningham |
| 3,609,087 A | 9/1971 | Chi et al. |
| 3,630,914 A | 12/1971 | Nankee et al. |
| 3,809,152 A | 5/1974 | Boehmer |
| 3,960,740 A | 6/1976 | Truett |
| 4,184,537 A | 1/1980 | Sauder |
| 4,224,801 A | 9/1980 | Tyree, Jr. |
| 4,249,388 A * | 2/1981 | Burns .......................... 62/185 |
| 4,606,837 A | 8/1986 | McEntire et al. |
| 4,974,419 A | 12/1990 | Sabin et al. |
| 5,071,582 A * | 12/1991 | Conville et al. ............ 510/184 |
| 5,118,434 A | 6/1992 | Meyer et al. |
| 5,202,044 A * | 4/1993 | Hagihara et al. ............. 252/68 |

(List continued on next page.)

FOREIGN PATENT DOCUMENTS

| CA | 544081 | 7/1957 |
| CA | 716052 | 8/1965 |
| GB | 352311 | 7/1931 |
| GB | 384089 | 12/1932 |
| JP | 59-091188 | 11/1982 |
| JP | 60-060178 | 9/1983 |

OTHER PUBLICATIONS

Shell Chemicals, Viscosity of PDO and MPG Water Solutions, Apr. 9, 1999.*

(List continued on next page.)

Primary Examiner—Sang Y. Paik
Assistant Examiner—Filip Zec
(74) Attorney, Agent, or Firm—Thomas J. Ring; Wildman, Harrold, Allen & Dixon LLP

(57) ABSTRACT

A temperature control system is described for producing and maintaining temperatures in a pre-defined space within a pre-defined temperature range. A working fluid comprising an aqueous solution of 1-3 propanediol is circulated through a heat transfer system in thermal communication with both the working fluid and the pre-defined space to produce and maintain the temperature in the pre-defined space that is within the pre-defined temperature range.

26 Claims, 2 Drawing Sheets

U.S. PATENT DOCUMENTS

| | | | |
|---|---|---|---|
| 5,387,360 A | | 2/1995 | Uekusa et al. |
| 5,394,936 A | | 3/1995 | Budelman |
| 5,435,379 A | | 7/1995 | Moslehi et al. |
| 5,470,497 A | * | 11/1995 | Schlosberg et al. ............ 252/68 |
| 5,494,597 A | * | 2/1996 | Krevalis et al. ............... 252/68 |
| 5,531,078 A | | 7/1996 | Day et al. |
| 5,651,257 A | * | 7/1997 | Kasahara et al. ............... 62/84 |
| 5,688,433 A | * | 11/1997 | Kasahara et al. ............... 252/68 |
| 5,727,393 A | * | 3/1998 | Mahmoudzadeh ............. 62/81 |
| 5,921,096 A | | 7/1999 | Warren |
| 5,974,816 A | * | 11/1999 | Endo ........................... 62/179 |
| 6,018,961 A | | 2/2000 | Venture et al. |
| 6,093,341 A | | 7/2000 | Minks et al. |
| 6,145,333 A | | 11/2000 | Richmond et al. |
| 6,415,614 B1 | * | 7/2002 | Greenfield et al. ............ 62/112 |

OTHER PUBLICATIONS

Edward Eaton, A Chemical Base for Engine Coolant/Antifreeze with improved Thermal Stability Properties, Mar. 5–8, 2001, SAE, 2001–01–1182.*

L.P. Polderman; The Physical Properties and Behavior of Ethylene and Propylene Glycol and Their Water Mixtures (Article); Jan. 26–29, 1959, Philadelphia, Pennsylvania; pp 1–15.

Edward R. Eaton, W.H. Boon and Chris J. Smith; A Chemical Base for Engine Coolant/Antifreeze with Improved Thermal Stability Properties (Article); Mar. 5–8, 2001; Detroit, Michigan; pp. 1–9.

Shell Chemicals website materials (www.shellchemicals.com) relating to 1,3–propanediol applications and chemical properties; What is 1,3–propanediol (PDO)? (Article); 2001.

S.B. Park, J.W. Lee and H. Lee; Surface Tensions and Thermal Conductivities of Aqueous LiBr–Based Solutions Containing n–Octanol and 2–Ethyl–1–Hexanol; Application to Absorption Heat Pump (Article); Jun. 25–30, Boulder, Colorado; pp. 1–22.

Viscosity of PDO Solutions (Graph).

Shell Chemicals; 1,3–Propanediol; specification sheet; Apr. 2000, 1 double–sided sheet.

Shell Chemicals; Viscosity of PDO and MPG Water Solutions; 1 sheet.

Pro KUHLSOLE GmbH; PEKASOL 50 Special Cooling Medium; 8 double–sided sheets.

Hydrol Chemicals; "do you want the best secondary refrigerant?"; brochure; 1997; 4 sheets.

Glycol data; 5 sheets.

Shell Chemicals; 1,3–Propanediol (PDO) Background; Apr. 9, 1999; 15 sheets.

* cited by examiner

TEMPERATURE CONTROL SYSTEM USING AQUEOUS 1,3-PROPANEDIOL SOLUTION

The present invention relates to temperature control systems and, more particularly, to a multi-stage commercial refrigeration system.

BACKGROUND OF THE INVENTION

Glycol-based fluids are commonly employed as coolant fluids. The formulations used are typically based on alkylene glycols such as ethylene and propylene glycol. However, problems exist with the use of these compounds as coolant fluids in certain applications. One use of such compounds is in commercial refrigeration systems. At temperatures approaching −40° F., the viscosity of propylene glycol compounds increases to the point where their use becomes impractical in commercial refrigeration systems charged with maintaining very low temperatures in product zones of the refrigeration units. This causes high pressure drop, low mechanical efficiency and high power consumption in the refrigeration system. In addition, ethylene glycol compounds are toxic. This causes concerns with regard to piping system integrity and problems with regard to detecting, repairing and cleaning up system leaks, changing of the refrigerant and disposal of the used refrigerant.

In view of the above, a requirement exists for a non-toxic heat transfer fluid having a viscosity low enough at temperatures down to approximately −40° F. to be used as a coolant fluid. A need also exists for a system which utilizes such a working fluid.

DESCRIPTION OF THE DRAWINGS

In the drawings illustrating embodiments of the present invention, and wherein like numerals refer to like parts wherever they occur.

DETAILED DESCRIPTION

Figure 1:
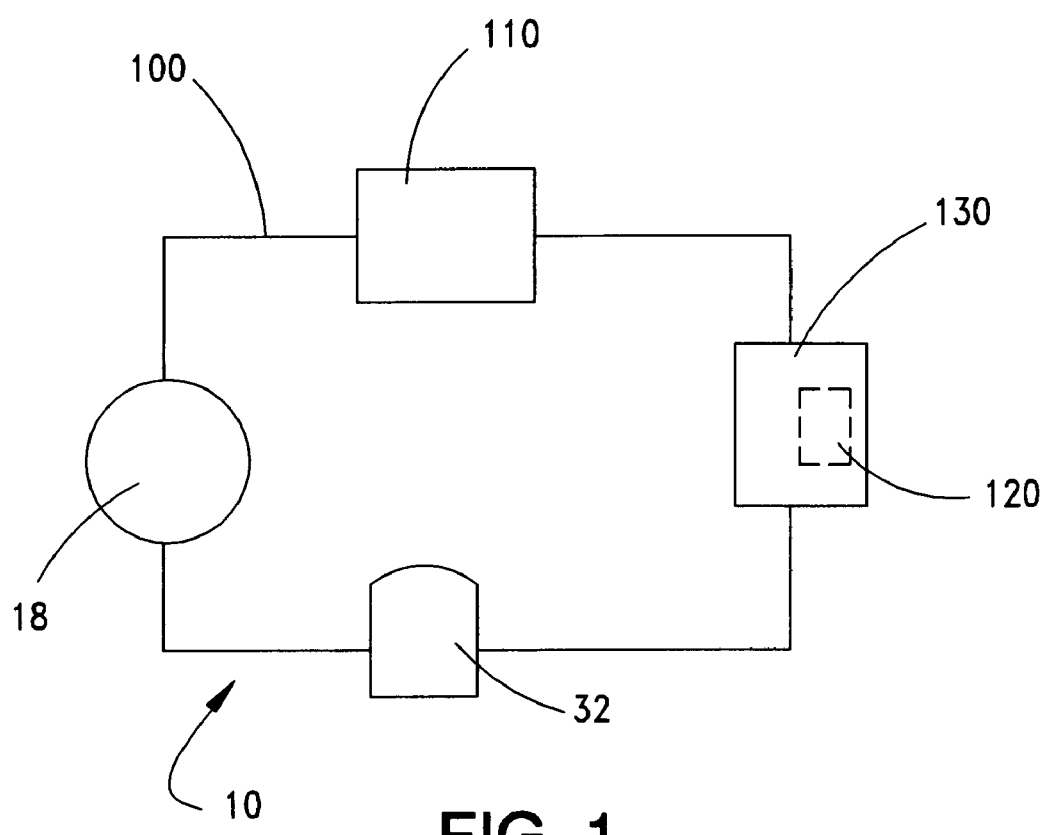
FIG. 1 is a block diagram of a temperature control system embodying the invention.

Referring to the drawings, FIG. 1 shows a block diagram of a temperature control system 10 using an aqueous solution of 1-3, propanediol as a non-compressible heat transfer medium, or working fluid, to produce and maintain temperatures in a pre-defined space within a pre-defined temperature range. The working fluid comprises an aqueous solution of 1-3, propanediol from 55% to 75% by weight. Alternatively, the working fluid may comprise an aqueous solution of 1,3-propanediol having water in an amount sufficient to adjust the viscosity of the aqueous solution to below 600 centipoise within the temperature range of −40° F. to −10° F. A heat transfer system 130 is in thermal communication with both the working fluid and a pre-defined space 120. As 1,3-propanediol working fluid flows through heat transfer system 130, heat is transferred to 1,3-propanediol working fluid from pre-defined 120 space via heat transfer system 130 to produce and maintain a temperature in the pre-defined space 120 that is within the pre-defined temperature range.

A fluid transfer system, generally designated 100, may be provided for conveying the 1,3-propanediol working fluid through the temperature control system. A pump system 18 including one or more pumps may be provided in fluid communication with fluid transfer system 100 for circulating the 1,3-propanediol working fluid through the temperature control system. A second heat transfer system 110 may also be provided in thermal communication with working fluid. Heat may then be transferred via 1,3-propanediol working fluid flowing through second heat transfer system 110 to produce a temperature in the working fluid that is within a second predefined temperature range.

Figure 2:
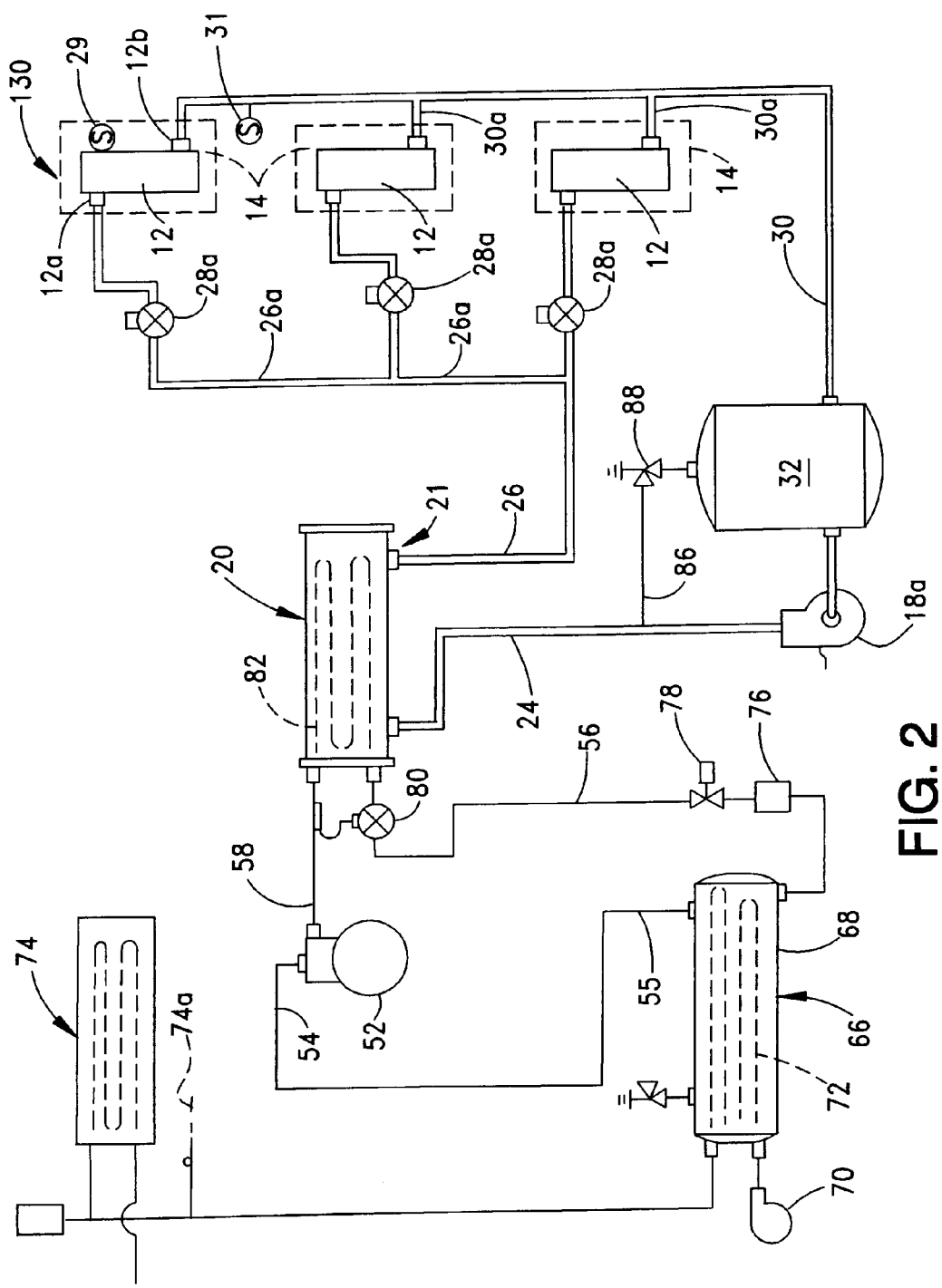
FIG. 2 is a schematic flow diagram of an embodiment of the invention, comprising a multi-stage cooling system as utilized in a commercial foodstore.

FIG. 2 shows a particular embodiment of the temperature control system of the present invention, comprising a multi-stage commercial refrigeration system utilizing an aqueous solution of 1,3-propanediol as the working fluid. This refrigeration system is tasked with maintaining the temperatures in a product zone of a cooling product merchandiser within a pre-defined temperature range.

In the refrigeration industry the term "commercial" is generally used with reference to foodstore and other product cooling applications in low and medium temperature ranges. "Low temperature" as used herein refers to product zone temperatures in the range of −20° F. to 0° F., and "medium temperature" (sometimes called "normal" or "standard" temperature) refers to product zone temperatures in the range of 25° F. to 50° F. Thus, the pre-defined temperature range to be maintained in a product zone of a low temperature system is −20° F. to 0° F., and the pre-defined temperature range to be maintained in a product zone of a medium temperature system is 25° F. to 50° F. In general, the maintenance of product zone temperatures within the range of −20° F. to 0° F. requires that the working fluid circulating through the temperature control system in or near the product zone be cooled to a temperature such that the portion of a heat transfer system in thermal communication with the product zone is maintained at a temperature within the range −35° F. to −5° F. Similarly, the maintenance of product zone temperatures within the range of 25° F. to 50° F. requires that the working fluid circulating through the temperature control system in or near the product zone be cooled to a temperature such that the portion of a heat transfer system in thermal communication with the product zone is maintained at a temperature within the range 15° F. to 40° F. Also, the term "1,3-propanediol" used herein will refer to any aqueous solution of 1,3-propanediol that will retain its flowability at the required medium and low commercial temperatures of a heat transfer system in thermal communication with product zones of the product merchandisers.

Referring now to FIGS. 1 & 2, the present embodiment is illustrated diagrammatically in the form of a multi-stage refrigeration system 10 including a fluid transfer system 100 and a pump system 18 comprising a fluid pump 18a for circulating 1,3-propanediol working fluid through the fluid transfer system. Heat transfer system 130 of this embodiment includes one or more other cooling heat exchangers 12, each incorporated into a respective product merchandiser 14. Each cooling heat exchanger 12 is in thermal communication with the product zone 120 to be cooled to within the pre-defined temperature range. FIG. 2 shows multiple product merchandisers 14 incorporated into the temperature control system. Alternatively, the system may be configured to cool a single product merchandiser. Second heat transfer system 110 comprises vapor compression refrigeration system including a cooling heat exchanger 20 for cooling 1,3-propanediol working fluid.

In the normal cooling or refrigerating stage for product merchandisers 14 in a store, pump 18a discharges 1,3-propanediol working fluid outwardly through a discharge conduit 24 to cooling heat exchanger 20 in which the working fluid is cooled to within a second pre-defined temperature range and from which the cold working fluid flows in fluid transfer system 100 through conduits 26, 26a leading to flow control valves 28a on the inlet sides 12a to the other cooling heat exchangers 12. Flow control valves 28a may comprise, for example, solenoid valves.

Other cooling heat exchangers 12 may be of any suitable configuration and typically will be a coil bank or bundle of tube and fin coil construction (not shown, but well known in the refrigeration art). Also typically, the product merchandiser 14 will be cooled by the circulation of air through the coil bundle between the fins of other heat exchangers 12, the air thus being cooled and giving up sensible heat to the 1,3-propanediol working fluid flowing through other heat exchangers 12 incorporated into product merchandisers 14. The outlets 12b from the other cooling heat exchangers 12 are connected by conduits 30, 30a back to the negative (suction) side of pump 18 through an accumulator or expansion tank 32 that will accommodate volumetric fluctuations in the 1,3-propanediol working fluid flow.

In this embodiment, cooling heat exchanger 20 forms a part of a vapor-compression refrigeration system incorporated into second heat transfer system 110. A compressor 52 discharges hot refrigerant vapor through line 54 to a condenser coil 68. The refrigerant may comprise a Freon compound, an aqueous solution of 1,3-propanediol or any other suitable refrigerant formulation. Liquid condensate from the condenser then flows through liquid line 56 to an evaporator coil 82 forming the cooling source for cold 1,3-propanediol working fluid in cooling heat exchanger 20, the refrigerant removing heat from the 1,3-propanediol working fluid and being vaporized and returned to compressor 52 through suction line 58. Alternate cooling and/or heating sources may be provided for heat exchanger 20 in lieu of the vapor-compression refrigeration system. By the arrangement described above, 1,3-propanediol working fluid may be cooled and subsequently conveyed through fluid transfer system 100 so as to selectively cool cooling heat exchangers 12 incorporated into multiple product merchandisers 14.

The vapor-compression system described above controls the cooling of the 1,3-propanediol working fluid in the fluid transfer system. In a typical supermarket installation there will be separate low temperature and medium temperature control systems to service a range of product merchandiser cooling requirements. Each temperature control system will be similar to the system shown in FIG. 2, and will typically include multiplexed compressors 52 (only one being shown in FIG. 2) discharging hot refrigerant vapor through line 54 and a condenser stage shown as a water-cooled tank condenser 66 receiving cooled refrigerant from compressor 52 through line 55, in which the refrigerant is condensed to a liquid and may be subcooled for most efficient refrigeration. The condenser 66 may be water-cooled by circulating water by a pump 70 through a closed water loop 72 within the condenser tank 68 from an exterior cooling tower or air cooled cooler 74 or an alternate cooling source, such as a ground water loop 74a. From the refrigerant condensing stage, liquid refrigerant flows in liquid line 56 through a drier 76 and solenoid valve 78 to an expansion valve 80 on the high side of an evaporator coil 82 forming the internal cooling source for the 1,3-propanediol working fluid in the cooling heat exchanger 20. The low side of the evaporator coil 82 connects through the suction line 58 back to compressor 52 to complete the vapor-compression cycle. In the cooling heat exchanger 20, the liquid refrigerant absorbs heat from the 1,3-propanediol working fluid circulated therethrough, thereby cooling the 1,3-propanediol fluid to within the second pre-defined temperature range.

It will be understood that in a central system servicing all medium temperature (or low temperature) merchandiser or other cold product zone requirements of a plurality of product merchandisers, the cooling heat exchanger 20 must chill the 1,3-propanediol solution to a temperature required to maintain the other cooling heat exchangers in the product merchandisers at the lowest temperature needed to maintain the coldest of the product zones at their pre-defined temperatures. For example, a fresh meat merchandiser requires the coldest medium temperature coil to be maintained at about 15° F. to maintain product zone temperatures of about 25° F. This means that a medium temperature system must cool the 1,3-propanediol liquid to a second pre-defined temperature range of about 2° F. to 10° F. and the piping runs of the fluid transfer system must be well insulated to prevent parasitic heat losses. Furthermore, adjustments may be required in 1,3-propanediol fluid flow to the other medium temperature product merchandisers 14 to achieve and maintain higher operating temperatures therein, such as coil heat transfer temperatures of 30° F. to 40° F. for dairy cases and produce coolers.

Circulation of 1,3-propanediol working fluid in the fluid transfer system is as previously described. Pump 18 pressurizes the 1,3-propanediol solution and pushes it through discharge conduit 24 through fluid transfer system 100 as required for cooling purposes. In the portion of fluid transfer system 110 flowing through cooling heat exchanger 20, the 1,3-propanediol solution is cooled and distributed through supply conduits 26, 26a and the valves 28a to other cooling heat exchangers 12 in product merchandisers 14 for normal cooling thereof. The 1,3-propanediol fluid picks up sensible heat, thus warming the 1,3-propanediol a few degrees (e.g., 5° F. to 10° F.). The 1,3-propanediol fluid is then returned by conduits 30, 30a to the liquid accumulator 32 and pump 18. Accumulator tank 32 is provided with a pressure relief by-pass pipe 86 controlled by a relief valve 88 having a pre-selected pressure setting. In addition, the size and volume of the accumulator 32 will be calculated on the basis of the requirements of each application, including the number of product merchandisers 14 that are in the system.

Product zone temperature sensors 29, 31 may be selectively used to signal the need for 1,3-propanediol flow control to regulate the flow of 1,3-propanediol working fluid in fluid transfer system 110 through other cooling heat exchangers 12 to maintain the temperatures in the product zones within the first pre-defined temperature range. Thus, it is clear that sensors 29, 31 operate to signal for regulating 1,3-propanediol working fluid flow in the fluid transfer system to produce and maintain the temperature in the product zones within the first pre-defined temperature range.

In this embodiment, fluid transfer system 100 for conveying the 1,3-propanediol working fluid comprises suitable lengths of flexible plastic tubing connecting pump 18a, heat exchanger 20, product merchandisers 14 and accumulator 32. The tubing may be formed from a vinyl or rubber compound, or the like. Alternatively, fluid transfer system 100 may incorporate piping or tubing formed from a relatively rigid metal (for example, copper alloy) or plastic material.

When specifying the composition of the 1,3-propanediol working fluid, several system design parameters must be taken into consideration. Some of the factors affecting the selection of a proper 1,3-propanediol formulation for a given application include the crystallizing temperature, relative viscosity, stability and heat capacity of the solution at system operating temperatures. To provide a 1,3-propanediol working fluid having a suitably low crystallizing temperature, any one of a range of compositions by weight percent may be specified, this range encompassing, but not being limited to, the composition of a binary solution comprising 1,3-propanediol and water at the eutectic. A eutectic composition of 1,3-propanediol and water will exhibit the lowest melting temperature of which a 1,3-propanediol/water solution is capable. Compositions of 1,3-propanediol and water close to the eutectic composition will also exhibit relatively low melting temperatures. Also, to maintain flowability of the 1,3-propanediol working fluid under the operating conditions prevailing in low or medium temperature commercial refrigeration systems, the working fluid composition should be specified such that its viscosity is below approximately 600 centipoise (cps) in the temperature range −40° F. to −10° F. Generally, it has been found that an aqueous solution containing 55%–75% by weight of 1,3-propanediol meets the above requirements for a refrigeration system operating in either of the medium or low temperature ranges.

Depending on the details of the application, it may also be necessary to add corrosion inhibitors, scale-preventing additives and/or organic dispersants to the 1,3-propanediol solution. The corrosion inhibitors may, for example, be selected from the group consisting of sodium phosphate and/or sodium silicate. In one embodiment, the corrosion inhibitor comprises phosphate ion in the range 500 to 1000 parts per million and silicate ion in the range 0 to 100 parts per million.

The cooling cycle of the 1,3-propanediol working fluid in the temperature control system is believed apparent from the foregoing description. It should be understood that the preceding is merely a detailed description of one embodiment of this invention and that numerous changes to the disclosed embodiment can be made in accordance with the disclosure herein without departing from the spirit or scope of the invention. The preceding description, therefore, is not meant to limit the scope of the invention. Rather, the scope of the invention is to be determined only by the appended claims and their equivalents.

What is claimed is:

1. A temperature control system to affect the temperatures of a pre-defined space, comprising:
    a working fluid comprising an aqueous solution of from 55% to 75% by weight 1,3-propanediol; and
    a closed loop refrigeration system that utilizes the working fluid to affect the temperature in the pre-defined space when the working fluid and the pre-defined space are in thermal communication.

2. The temperature control system of claim 1 further comprising a fluid transfer system for conveying the working fluid through the temperature control system.

3. The temperature control system of claim 1 further comprising a pump system in fluid communication with the fluid transfer system for circulating the working fluid through the temperature control system.

4. The temperature control system of claim 1, wherein the closed loop refrigeration system comprises a heat transfer system in thermal communication with the working fluid for producing a temperature in the working fluid that is within a predefined temperature range.

5. The temperature control system of claim 4 wherein the temperature within the predefined temperature range is produced in the working fluid by thermal exchange between the working fluid and a second working fluid circulating through the heat transfer system.

6. The temperature control system of claim 5 wherein the second working fluid comprises a Freon compound.

7. The temperature control system of claim 5 wherein the second working fluid comprises an aqueous solution of from 55% to 75% by weight 1,3-propanediol.

8. The temperature control system of claim 2 wherein a portion of the fluid transfer system is formed from flexible tubing.

9. The temperature control system of claim 4 wherein the heat transfer system includes a cooling heat exchanger for cooling the 1,3-propanediol working fluid.

10. The working fluid system of claim 1, wherein the working fluid further comprises a corrosion inhibitor.

11. The working fluid system of claim 10 wherein the corrosion inhibitor is selected from the group consisting of sodium phosphate and/or sodium silicate.

12. The working fluid system of claim 1, wherein the working fluid is non-compressible.

13. A method for using a 1,3-propanediol solution comprising the steps of:
    formulating an aqueous solution of 1,3-propanediol having water in an amount sufficient to adjust the viscosity of the aqueous solution to below 600 centipoise within the temperature range of −40° F. to −10° F.;
    providing a closed loop refrigeration system in thermal communication with a pre-defined space; and
    circulating the 1,3-propanediol solution through the closed loop refrigeration system to affect a temperature of the predefined space.

14. The method of claim 13, further comprising the step of producing a temperature in the 1,3-propanediol solution that is within a predefined temperature range.

15. The method of claim 14 wherein the step of producing the predefined temperature range in the 1,3-propanediol solution comprises the step of cooling the 1,3-propanediol solution to within the temperature range of −40° F. to −10° F.

16. The method of claim 13 wherein the 1,3-propanediol solution further comprises a corrosion inhibitor.

17. The method of claim 15 wherein the corrosion inhibitor comprises a phosphate ion in the range 500 to 1000 parts per million and silicate ion in the range 0 to 100 parts per million.

18. A method for using a 1,3-propanediol comprising the steps of:
    formulating an aqueous solution of from 55% to 75% by weight 1,3-propanediol;
    providing a closed loop refrigeration system in thermal communication with a pre-defined space; and
    circulating the 1,3-propanediol solution through the closed loop refrigeration system to affect a temperature of the predefined space.

19. The method of claim 18 further comprising the step of producing a temperature in the 1,3-propanediol solution that is within a second predefined temperature range.

20. The method of claim 19 wherein the step of producing a predefined temperature range in the 1,3-propanediol solution comprises the step of cooling the 1,3-propanediol solution to within the temperature range of −40° F. to −10° F.

21. The method of claim 20 wherein the 1,3-propanediol solution further comprises a corrosion inhibitor.

22. The method of claim 21 wherein the corrosion inhibitor comprises a phosphate ion in the range 500 to 1000 parts per million and silicate ion in the range 0 to 100 parts per million.

23. A temperature control system, comprising: a working fluid comprising an aqueous solution of from 55% to 75% by weight 1,3-propanediol; and
    means for affecting the temperature in the pre-defined space by placing the working fluid and the pre-defined space in thermal communication.

24. The temperature control system of claim 23 further comprising a means for fluid transfer for conveying the working fluid through the temperature control system.

25. The temperature control system of claim 24 further comprising a means for pumping in fluid communication with the fluid transfer means for circulating the working fluid through the temperature control system.

26. The temperature control system of claim 23 further comprising means for heat transfer in thermal communication with the working fluid for producing a temperature in the working fluid that is within predefined temperature range.

* * * * *

UNITED STATES PATENT AND TRADEMARK OFFICE
CERTIFICATE OF CORRECTION

PATENT NO.    : 6,742,345 B2
DATED         : June 1, 2004
INVENTOR(S)   : Richard P. Carr It is certified that error appears in the above-identified patent and that said Letters Patent is hereby corrected as shown below:

Column 6,
Line 50, after "a" and before "predefined", delete "second".

Column 8,
Line 2, insert -- a -- between "comprising" and "means".

Signed and Sealed this

Thirty-first Day of August, 2004

JON W. DUDAS
*Director of the United States Patent and Trademark Office*

UNITED STATES PATENT AND TRADEMARK OFFICE
CERTIFICATE OF CORRECTION

PATENT NO. : 6,742,345 B2
DATED : June 1, 2004
INVENTOR(S) : Richard P. Carr

It is certified that error appears in the above-identified patent and that said Letters Patent is hereby corrected as shown below:

Column 6,
Line 50, after "a" and before "predefined", delete "second".

Column 8,
Line 2, insert -- a -- between "comprising" and "means".

Signed and Sealed this

Fourteenth Day of September, 2004

JON W. DUDAS
*Director of the United States Patent and Trademark Office*